July 16, 1929.  E. J. KEARNEY ET AL  1,720,734
MACHINE TOOL ORGANIZATION
Filed June 28, 1923  2 Sheets-Sheet 1

INVENTORS
Edward J. Kearney
BY Joseph B. Armitage
Fred G. Parsons
ATTORNEY.

July 16, 1929.　　E. J. KEARNEY ET AL　　1,720,734
MACHINE TOOL ORGANIZATION
Filed June 28, 1923　　2 Sheets-Sheet 2
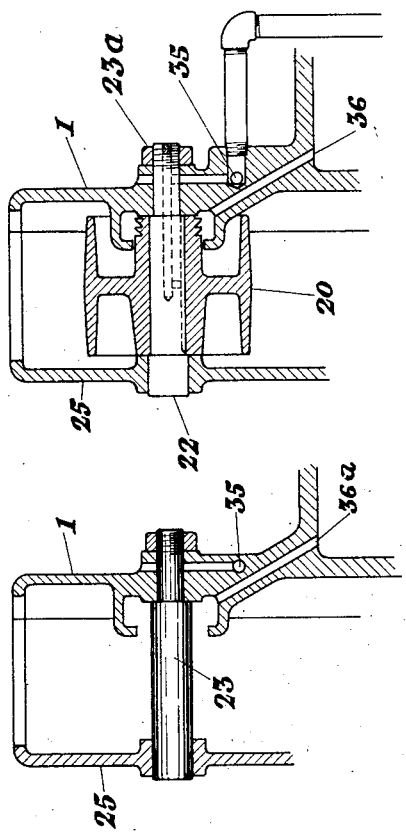
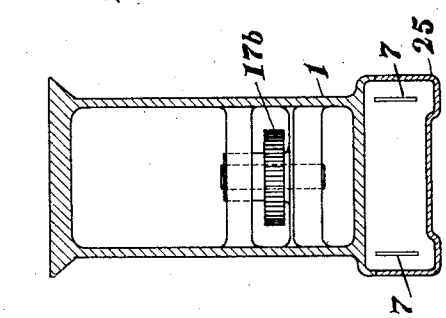
INVENTORS
Edward J. Kearney
BY Joseph B. Armitage
Fred G. Parsons
ATTORNEY.

Patented July 16, 1929.

1,720,734

UNITED STATES PATENT OFFICE.

EDWARD J. KEARNEY, OF WAUWATOSA, AND JOSEPH B. ARMITAGE, OF MILWAUKEE, WISCONSIN, ASSIGNORS TO KEARNEY & TRECKER CORPORATION, OF WEST ALLIS, WISCONSIN.

MACHINE-TOOL ORGANIZATION.

Application filed June 28, 1923. Serial No. 643,226.

This invention relates to improvements in a machine tool organization with particular reference to machine tools which are to be belt driven from an exterior or relatively distant source, such as a line shaft pulley, the position of which relative to the machine tool structure may be variable according to the particular requirements of the user.

In such machines, it has in the past caused great inconvenience when the necessary position of the machine in relation to the power source caused moving portions of the driving belt to pass near to or through spaces or zones reserved for some of the operative elements or hand operated instrumentalities of the machine.

Since various exigencies of floor space, and in the shifting about or positioning of the machine relative to its drive source according to various necessities, were likely to cause portions to come in these inconvenient positions, it has frequently been the custom to provide what is commonly termed a jack shaft, which could be more suitably located than the main source or line shaft, to be driven thereby, and from which the machine could in turn be driven. This expedient requires extra expense for material, labor, and delay, and neither did this always provide a full remedy for the difficulty, in which case no remedy has heretofore been provided, the possible relative positions of the machine and source being then limited to such as did not bring about the undesirable belt positions.

In the machine commonly known as a horizontal knee type milling machine, which has been used in this application to illustrate our invention, the rear end of the tool spindle should, for various purposes, be readily accessible to the operator.

The overarm of such a machine is normally located somewhat above the spindle and nearly in a vertical line therewith when one overarm only is used; or when two are used, they are usually symmetrically disposed above and to the one side and the other of the vertical line through the spindle axis. In any case, the overarms are adjustable or movable in the column or machine structure in order that, for certain classes of work, they may be pushed forward to assist in supporting the reactions set up by the cutting operations, in which case they will project from the column on the front, or cutter side, while for other classes of work they are not required, in which case they will be pushed rearwardly to be out of the field of operations, and will then project from the rear of the machine, which is also the side where the drive pulley is ordinarily located.

Convenience and economy of design dictate that the main drive pulley of such a machine should be located relatively below the tool spindle and therefore also below the overarm, or overarms, and since the line shaft is ordinarily some distance above the machine, the belt must pass through the horizontal plane of the spindle axis and also through the horizontal plane in which the overarm moves in order to drive the machine from the line shaft source.

The desired access to the rear end of the spindle and the space for the required overarm movement have been seriously inconvenienced by the belt as previously set forth and in some cases the operator has been endangered in the normal operation of the machine.

It is the broad purpose of our joint invention to overcome the described difficulties and inconveniences by means which will combine to work improvement in the machine organization and structure, and safety to the operator.

Another object is to incorporate in the machine organization itself the necessary elements and means whereby the machine may be positioned where desired, relative to the drive source, without delay, extra cost, danger, or inconvenience, and the belt may drive the machine from a distant source but nevertheless be restrained to a path, portions of which are predetermined, in order that the belt may not enter areas or zones properly reserved for various operating functions.

Another object is to provide in a machine organization an efficient belt guard, combined into the machine structure whereby the main machine structure and the guard will be mutually stiffened, and the operator will be provided with complete protection against the belt to a point above any of his normal machine operating activities, which are generally limited by machine designers to a height or zone not exceeding six feet from the floor line of the machine, or in other words, above the lower plane of the base.

Another object is to cause a removable belt guard member or element to serve the various purposes of stiffening the main structure and completing the same to form a pleasing outline without the usual projecting secondary housing necessary for the protection of the operator from the belt and driving pulley, whereby added convenience of cleaning and operating the machine may be had and whereby the guard member and the column may form a unitary structure.

Another object is to guide the driving belt where it passes through zones, areas, or planes reserved for various machine activities and instrumentalities, whereby such portions of its path may be predetermined by the builder irrespective of various conditions of future use.

Another object is to provide, where necessary, for the suitable and certain lubrication of the mechanism and devices incident to the accomplishment of the various other purposes of our invention.

Another object is generally to simplify and improve the construction and operation of machine tool driving devices and their organization with the machine tool structure.

Other objects will be apparent from this specification and from the accompanying drawings and claims.

In the accompanying drawings the invention is illustrated in one of its preferred practical embodiments, the particular construction disclosed being susceptible of wide modification without departing from the scope and purpose of the invention.

In the accompanying drawings—

Figure 3 is an enlarged section taken on line 3—3 of Figure 2.

Figure 4 is an enlarged section taken on line 4—4 of Figure 2.

Figure 5 is a horizontal section taken on line 5—5 of Figure 1.

Like parts are identified by the same reference characters throughout the several views.

Figure 1:
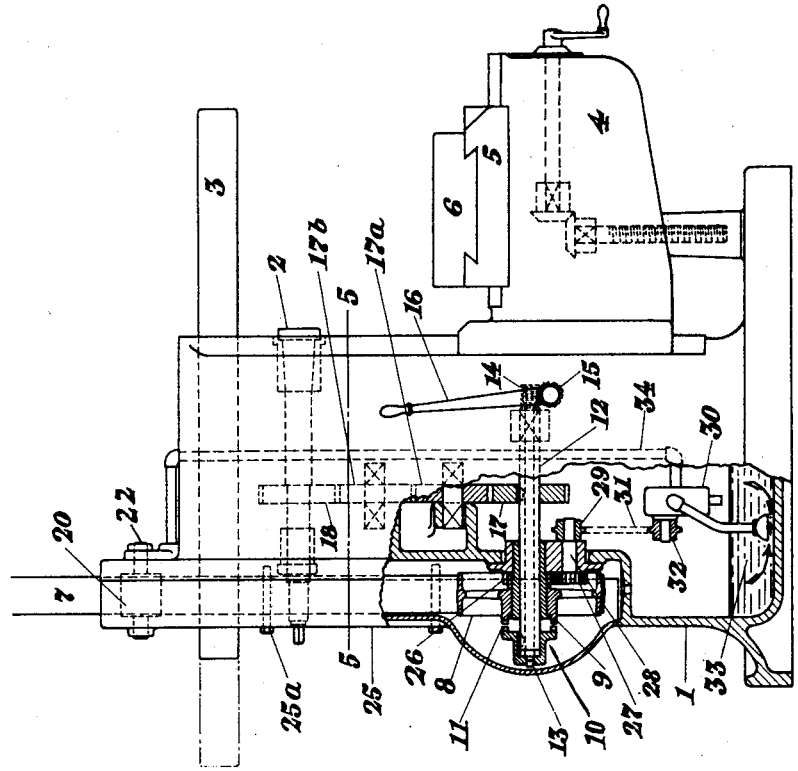
Figure 1 is a side elevation of a device embodying this invention, the machine chosen being a machine commonly known as a horizontal knee and column type milling machine.
Figure 2:
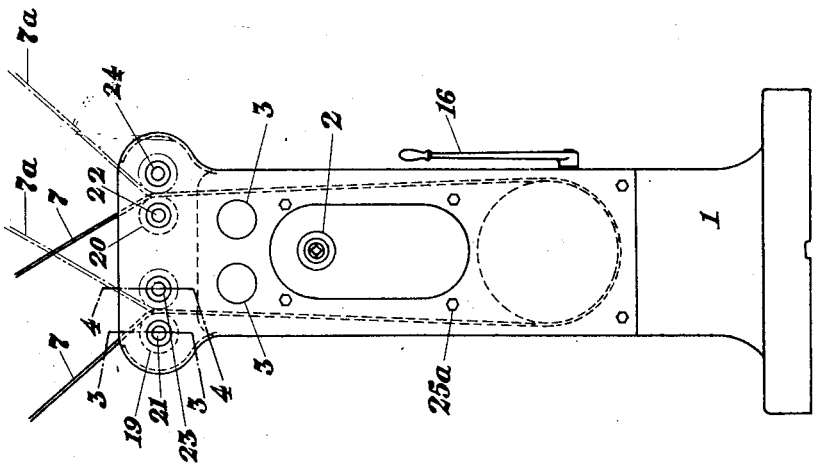
Figure 2 is a rear elevation, viewing the machine from the side where the main drive pulley and belt are located, the tool spindle nose and work space being on the opposite side.

It will be understood that the machine may embody the various mechanisms common to a machine of this type, altho in the drawings and for the sake of clearness and simplicity such parts as are common, and are not necessary to a clear understanding of our invention, are to a large extent omitted.

In the machine as illustrated in the drawings, a column or main housing 1 supports a rotatable tool spindle 2, a pair of overarms 3, adjustably mounted in the structure, a knee 4, slidably mounted on column 1, a saddle 5, slidably mounted on knee 4, and a table 6, slidably mounted on saddle 5. A drive belt having portions 7—7 extends from a source in this case relatively above the machine, which may be a line shaft pulley or other suitable driving source. One of the belt portions 7—7 drives a pulley 8, which on one face of its hub is provided with clutch teeth 9. A clutch member 10 has clutch teeth 11 and is slidably keyed to a tubular shaft 12 and may be moved to engage or disengage clutch teeth 9 and 11 by means of a rod 13 extending thru shaft 12 and at one end provided with circular rack teeth 14 which engage a pinion 15 operated to engage and disengage the clutch by means of a hand lever 16.

If the clutch teeth 9 and 11 are engaged, the shaft 12 is driven by the pulley and may drive the spindle 2 through the gears 17 and 18 and the intermediate gears $17^a$ and $17^b$.

The belt portions 7—7 are restrained and guided by idler pulleys 19 and 20, which revolve on bearing pins 21 and 22, which are removably held in place by the nuts $23^a$. This arrangement of the idler pulleys restrains the belt if the belt tends to slant in the direction indicated by the full lines. Should the machine be located on the other side of the line shaft, the belt would tend to slant in the opposite direction, as indicated by the dotted lines $7^a$, and in that case the pins 21 and 22, and pulleys 19 and 20, would be set in alternative positions on the opposite side of the respective belt portions, there being holes provided for this purpose as will be later described.

In either case the belt would be restrained to follow a path unaffected by the differences of the relative source position and which would keep all belt portions clear of either overarm or of the spindle, the path of the lower end of the belt being fixed by engagement around the rim of the pulley 8.

A belt guard member or element 25, removably bolted to the column 1, completes a unitary structure of box-like exterior form and shields or guards the belt completely on three vertical sides, the fourth vertical side and the bottom being shielded by the column 1, and the upper end of the resulting belt chamber or guard being open. The upper end is, however, higher up than any of the normal activities of the operator. The guard member 25 being solidly bolted to the column 1 by means of bolts $25^a$, the column and guard member exert a mutually stiffening effect upon one another, which results in increased rigidity of both. When the guard member 25 is removed, the belt is completely exposed and may be freely removed from the pulleys or engaged therewith, as may be necessary for belt repairs or when the machine is to be moved to a new location.

The pulley 8 has on its hub a gear 26 which meshes with and when the pulley is driven, continuously drives a gear 27 on a shaft 28 which also has fixed upon it a sprocket 29, which drives a pump 30 through the chain 31 and sprocket 32. Oil is then continuously drawn by the pump from a reservoir 33 and delivered to a pipe 34 leading to an oil channel 35 which communicates by means of suitable channels with one end of the pins 21 and 22 when the pins are in either of their positions.

When the pins 21 and 22 are removed from one set of holes, for purposes previously described, the oil passages leading to that set of holes are then free; and to close off such free passages, dummy pins 23 and 24 are inserted to replace the pins 21 and 22. The dummy pins have no oiling facilities and would therefore not form suitable bearings for the pulleys, and to prevent their being accidentally used inside the pulleys 19 and 20, the portion of the pin which would pass through the pulley is made too large to do so. There being two sets of holes, the dummy pins may always occupy the holes not occupied by the active bearing pins.

The oil which is forced to channel 35 passes on through suitable holes provided in the pins 21 and 22 and lubricates the pulley bearing, after which it passes on and is returned to the interior of the column by means of passages 36, and eventually finds its way back through the interior of the column, to the reservoir 33, to be used again. Suitable oil slingers, etc., are provided to prevent the oil from working back along the hub of the pulley and finding its way to the belt.

Having thus revealed our invention and indicated its advantages, we will now point out the particular features in which our invention differs from the prior art.

We claim:

1. In a machine tool, the combination of a machine structure, a drive pulley supported therefrom, a belt adapted to drive the pulley from a source exterior to and variable in its position relative to the structure, and other pulleys each supported from the structure and each co-acting with the first named pulley in either of two alternative positions, and when in the one position restraining the belt to a path in part predetermined irrespective of certain various source positions; and when in the other position restraining the belt to a path predetermined in substantially the same part irrespective of other various source positions.

2. In a machine tool, the combination of a machine structure, a pulley supported therefrom, a horizontal spindle journaled in said structure at a level above said pulley and adapted to be driven from said pulley, a belt adapted to pass through the horizontal plane of the spindle axis and to drive the pulley from a source exterior to and movable relative to the structure, and a second pulley supported from the structure and co-acting with the first pulley to fix the path of the belt where said path intersects said plane.

3. In a machine tool, the combination of a machine structure, a pulley supported therefrom a horizontal spindle journaled in the structure at a level above said pulley and adapted to be driven from said pulley, a belt adapted to pass through the horizontal plane of the spindle axis at different points and to drive said pulley from a source exterior to and movable relative to the structure, and a plurality of other pulleys supported from the structure and each co-acting with the first pulley respectively to predetermine the path of said belt at said different points.

4. In a machine tool, the combination of a machine structure, a pulley supported therefrom, a horizontal, rotatable spindle journaled in the structure and adapted to be driven from said pulley, a belt adapted to pass through the horizontal plane of the spindle axis and to drive said pulley from a source distant from and movable relative to the structure, and other pulleys each supported from the structure and each co-acting with the first named pulley to predetermine the path of said belt where said path intersects said plane, one of said other pulleys having alternative positions relative to said structure corresponding to different relative positions of said source.

5. In a machine tool, the combination of a machine structure, a pulley supported therefrom, a horizontally adjustable overarm supported from and guided in the structure, a belt adapted to pass through the horizontal plane in which the overarm moves and having portions disposed on opposite sides of the overarm path and adapted to drive the pulley from a source exterior to and shiftable relative to the structure, and other pulleys each supported by the structure and each co-acting with the first named pulley to fix a portion of the path of the belt where it passes through the said plane, and to thereby space the belt outside the path of movement of the overarm, one of said other pulleys being shiftable to alternative positions corresponding to different positions of said source.

6. In a machine tool, the combination of a machine structure, a pulley supported therefrom, a pair of horizontally adjustable overarms supported from and guided in the structure, a belt adapted to pass through the horizontal plane in which one of the overarms moves and having portions disposed on opposite sides of the path of movement of one of the overarms and adapted to drive said pulley from a source exterior to and movable relative to the structure, and a second pulley supported from the structure and co-acting with the first named pulley to fix a portion of the path of the belt where it passes through said plane and to thereby space the belt outside the path of movement of either overarm.

7. In a machine tool, the combination of a machine structure, a pulley supported from the structure and adapted to be belt driven from a source exterior to the structure, and means adapted to co-operate with the pulley to determine a portion of the belt path and including a bearing having alternative positions both supported from the structure, an oil reservoir and bearing oiling means including a pump and oil channels adapted to circulate oil between the reservoir and the bearing when said bearing is in either of its alternative positions.

8. In a machine tool, the combination of a machine structure, a pulley supported from the structure and adapted to be belt driven from a source exterior to the structure, means adapted to co-operate with the pulley to determine a portion of the belt path and including two pulley bearings, each having alternative positions and both supported by the structure in either of their positions, an oil reservoir and bearing oiling means including a pump and oil channels adapted to circulate oil between the reservoir and each bearing when said bearings are in either of the alternative bearing positions.

9. In a milling machine, the combination of a column having upstanding walls, a spindle supported from said column, drive mechanism for said spindle including a pulley rotatably supported from one of said walls, a belt adapted to drive said pulley from a source above said column and movable relative thereto, operating instrumentalities adjacent some of said column walls, guide means associated with the wall from which said pulley is supported for fixing the path of said belt adjacent said instrumentalities despite changes in the position of said source, and a guard member co-operative with the last named wall to form therewith a chamber for said pulley and said belt substantially closed to a point above said instrumentalities.

10. In a milling machine organization, the combination of a structure comprising a base and upstanding walls forming some of the elements of a box-like housing adapted to support and to substantially enclose a spindle drive train including a pulley, a belt adapted to actuate said pulley from a source distant from and movable relative to the structure, a belt guard member in part removably fixed to said structure to co-operate therewith to substantially enclose a portion of the path of said belt and to substantially conform to the exterior of said box-like housing, and a second pulley adapted to co-act with the first named pulley to predetermine the position of said portion of the belt path relative to said structure.

11. In a belt driven machine tool having an overarm at an upper level and a pulley at a lower level and adapted to receive power from said belt, the combination of belt guide means adapted for the spacing of different belt portions on opposite sides of said overarm and to maintain the position thereof irrespective of changes in the position of the power source from which said belt is driven.

EDWARD J. KEARNEY.
JOSEPH B. ARMITAGE.